(12) United States Patent
Hogan et al.

(10) Patent No.: US 11,970,429 B2
(45) Date of Patent: Apr. 30, 2024

(54) CORE-SHELL COMPOSITE PARTICLES AND METHODS OF MAKING SAME

(71) Applicant: CARBO CERAMICS INC., Houston, TX (US)

(72) Inventors: Keith Hogan, Dublin, GA (US); Steve Canova, Macon, GA (US); David Osby, Houston, TX (US)

(73) Assignee: CARBO CERAMICS INC., Houston, TX (US)

( * ) Notice: Subject to any disclaimer, the term of this patent is extended or adjusted under 35 U.S.C. 154(b) by 721 days.

(21) Appl. No.: 17/060,908

(22) Filed: Oct. 1, 2020

(65) Prior Publication Data

US 2021/0101848 A1 Apr. 8, 2021

Related U.S. Application Data

(60) Provisional application No. 62/910,150, filed on Oct. 3, 2019.

(51) Int. Cl.
| | | |
|---|---|---|
| *A01N 25/26* | (2006.01) |
| *A01N 59/06* | (2006.01) |
| *B01J 20/12* | (2006.01) |
| *B01J 20/26* | (2006.01) |
| *B01J 20/28* | (2006.01) |
| *B01J 20/32* | (2006.01) |
| *C05D 9/02* | (2006.01) |
| *C05G 5/30* | (2020.01) |
| *C05G 5/35* | (2020.01) |
| *C09K 17/04* | (2006.01) |
| *C09K 17/48* | (2006.01) |

(52) U.S. Cl.
CPC .............. *C05G 5/37* (2020.02); *A01N 25/26* (2013.01); *A01N 59/06* (2013.01); *B01J 20/12* (2013.01); *B01J 20/261* (2013.01); *B01J 20/28021* (2013.01); *B01J 20/3208* (2013.01); *B01J 20/3225* (2013.01); *B01J 20/3236* (2013.01); *B01J 20/3293* (2013.01); *C05D 9/02* (2013.01); *C05G 5/35* (2020.02); *C09K 17/04* (2013.01); *C09K 17/48* (2013.01)

(58) Field of Classification Search
None
See application file for complete search history.

(56) References Cited

U.S. PATENT DOCUMENTS

| | | |
|---|---|---|
| 2,700,605 A | 1/1955 | Hornibrook |
| 3,903,333 A | 9/1975 | Shirley, Jr. et al. |
| 4,521,239 A | 6/1985 | Simms et al. |
| 4,579,579 A | 4/1986 | Kerr |
| 4,936,897 A | 6/1990 | Pipko et al. |
| 5,395,449 A | 3/1995 | Quadir et al. |
| 5,399,186 A | 3/1995 | Derrah et al. |
| 5,454,851 A | 10/1995 | Zlotnikov et al. |
| 5,466,274 A | 11/1995 | Hudson et al. |
| 5,599,374 A | 2/1997 | Detrick |
| 5,851,261 A | 12/1998 | Markusch et al. |
| 6,080,221 A | 6/2000 | Moore |
| 6,165,550 A | 12/2000 | Markusch et al. |
| 6,210,625 B1 | 4/2001 | Matsushita et al. |
| 6,749,659 B1 | 6/2004 | Yu et al. |
| 6,936,573 B2 | 8/2005 | Wertz et al. |
| 7,410,522 B2 | 8/2008 | Green |
| 7,452,399 B2 | 11/2008 | Whittington |
| 8,617,284 B2 | 12/2013 | Kottegoda et al. |
| 8,668,759 B2 | 3/2014 | Antens et al. |
| 8,764,873 B2 | 7/2014 | Nevin |
| 8,940,074 B2 | 1/2015 | Kuo et al. |
| 9,296,661 B1 | 3/2016 | Ankeny |
| 9,328,030 B2 | 5/2016 | Burnham et al. |
| 9,416,064 B2 | 8/2016 | Yang et al. |
| 9,561,988 B2 | 2/2017 | Du et al. |
| 9,586,869 B1 | 3/2017 | Burnham et al. |
| 2003/0220200 A1 | 11/2003 | Wertz et al. |
| 2004/0050126 A1 | 3/2004 | Green |
| 2005/0066697 A1 | 3/2005 | Cline et al. |
| 2005/0076687 A1 | 4/2005 | Whittington |
| 2011/0033608 A1 | 2/2011 | Figuly et al. |
| 2011/0296887 A1 | 12/2011 | Kottegoda et al. |
| 2012/0125064 A1 | 5/2012 | Joseph et al. |
| 2012/0272700 A1 | 11/2012 | Nevin |
| 2014/0366598 A1 | 12/2014 | Carmo |
| 2014/0366599 A1 | 12/2014 | Beckingham et al. |
| 2015/0101374 A1 | 4/2015 | Burnham et al. |
| 2017/0362139 A1 | 12/2017 | Zhang et al. |
| 2019/0031574 A1 | 1/2019 | Liu et al. |

FOREIGN PATENT DOCUMENTS

| | | |
|---|---|---|
| EP | 0897745 A4 | 2/1999 |
| RU | 2243639 C1 * | 1/2005 |
| WO | 2018160821 A1 | 9/2018 |

OTHER PUBLICATIONS

Pena et al., Adsorption of nutrients on natural Spanish clays for enriching seed coatings: Absorption, 2017, 23:821-829 (Year: 2017).*
Mumpton, "Using Zeolites in Agriculture" (Chapter VIII) Department of the Earth Sciences, State University College, 34 pages.
Farahat et al., "New Preparation, characterization and application for coated Urea using Aswan Red Clay" Journal of Soil Science and Agricultural Engineering, Mansoura University, Dec. 2016, vol. 7, Iss. 12, p. 907-911.
International Search Report and Written Opinion dated Feb. 9, 2021 for Application No. PCT/US2020/53764.
Ebben et al., "The Calcination of Kaolin Clay" Feeco International, retrieved Nov. 24, 2020, 8 pages.
Canadian Office Action dtd Jan. 30, 2024 for Application No. 3,153,492.

* cited by examiner

*Primary Examiner* — Alton N Pryor
(74) *Attorney, Agent, or Firm* — Patterson + Sheridan, LLP

(57) ABSTRACT

A composite particle is described herein. The composite particle can contain a seed particle of an agricultural treatment material and a shell disposed on the seed particle, wherein the shell comprises a clay.

16 Claims, 2 Drawing Sheets

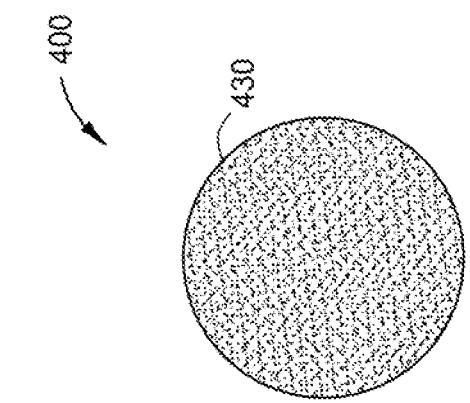
FIG. 5
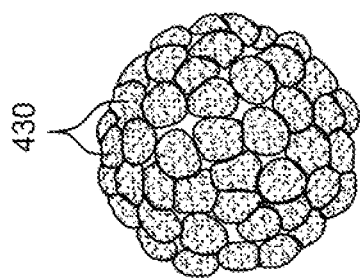
FIG. 4
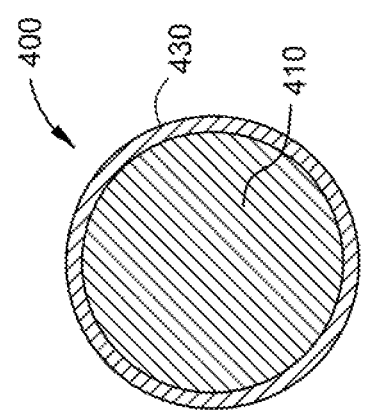
FIG. 6
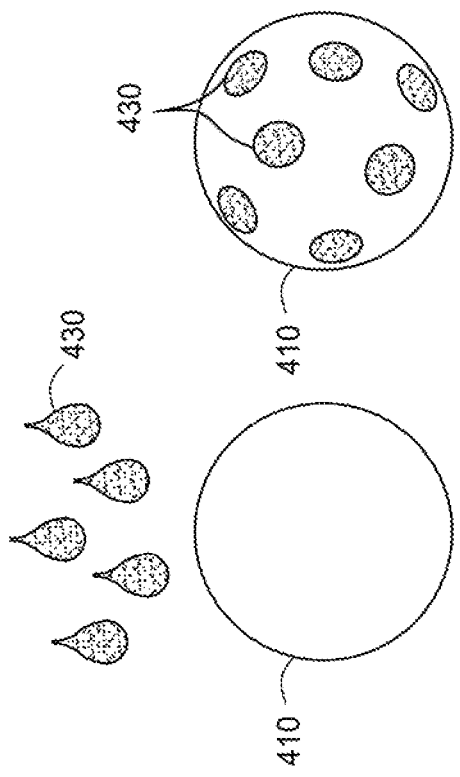
FIG. 3
FIG. 2

CORE-SHELL COMPOSITE PARTICLES AND METHODS OF MAKING SAME

CROSS-REFERENCE TO RELATED APPLICATIONS

This application claims the benefit of U.S. Provisional Patent Application No. 62/910,150, filed Oct. 3, 2019. This application incorporates the above referenced application by reference herein in its entirety.

FIELD

The present disclosure relates to core-shell composite particles and methods of making core-shell composite particles.

BACKGROUND

Fertilizer pellets are used in agriculture to deliver nutrients, such as nitrogen, phosphorus, potassium, sulfur, calcium, and magnesium to plants. Oftentimes, fertilizer pellets are coated to prevent saturation or premature elution of the nutrients into the area to be treated. Many attempts to provide a fertilizer product having a coating which provides for slow release of the fertilizer, rendering the fertilizer application effective over a long period of time, have been made. Many such processes have undesirable effects, such as sticky buildup in the coating equipment and release of chemicals from the slow release coatings into the surrounding environment.

There is a need, therefore, for fertilizer pellets, and other agricultural treatment pellets, to have environmentally friendly slow-release coatings that can be processed without sticky buildup and without sacrificing fertilizer, or other treatment material, concentration in each pellet.

BRIEF SUMMARY

A composite particle is disclosed. The composite particle can include a seed particle containing an agricultural treatment material. The composite particle can also include a shell deposited onto the seed particle. The shell can include a clay.

A method of making a composite particle is also disclosed. The method can include atomizing a slurry containing a clay into droplets, coating a seed particle containing an agricultural treatment material with the droplets to form a green pellet, and drying the green pellet to provide the composite particle.

A method of making a coated composite particle is also disclosed. The method can include atomizing a slurry containing a clay into droplets and coating a seed particle containing an agricultural treatment material with the droplets to form a green pellet. The method can also include drying the green pellet to provide a composite particle and coating the composite particle with a biodegradable polymer to provide the coated composite particle.

BRIEF DESCRIPTION OF THE DRAWINGS

The present disclosure may best be understood by referring to the following description and accompanying drawings that are used to illustrate embodiments of the disclosure. In the drawings:

FIG. 2 illustrates a schematic view of a shell slurry being sprayed onto a seed particle, according to an embodiment.

FIG. 3 illustrates a schematic view of the shell slurry wetting the outer surface of the seed particle, according to an embodiment.

FIG. 4 illustrates a schematic view of the shell slurry solidifying on the seed particle, according to an embodiment.

FIG. 5 illustrates a schematic view of the solidified shell slurry (now referred to as a shell layer) on the seed particle, thereby forming a composite particle, according to an embodiment.

FIG. 6 is a cross-sectional view of the composite particle of FIG. 5, according to an embodiment.

DETAILED DESCRIPTION

Figure 1:
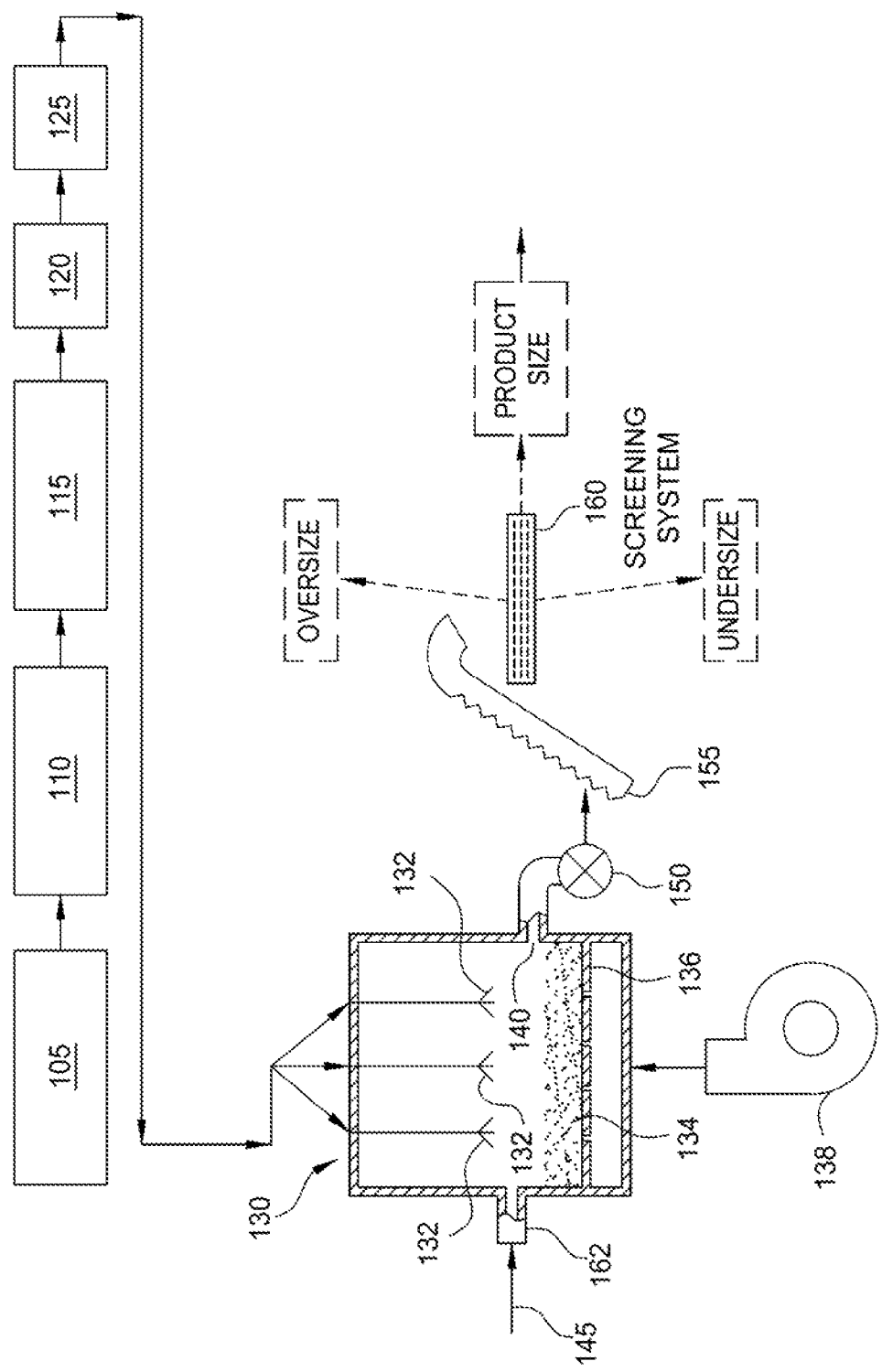
FIG. 1 is a schematic diagram illustrating a system for preparing composite particles, according to one embodiment.

In the following description, numerous specific details are set forth. However, it is understood that embodiments of the disclosure may be practiced without these specific details. In other instances, well-known structures and techniques have not been shown or described in detail in order not to obscure the understanding of this description.

The term "biodegradable," as used herein, means the ability of a chemical or coating to react to dissolve or breakdown into smaller components by microorganisms and/or natural environmental factors.

The term "ceramic," as used herein, means any nonmetallic, inorganic solid material.

The present disclosure is directed to core-shell composite particles and methods of making same. The core-shell composite particles disclosed herein can include one or more agricultural treatment materials. In one or more embodiments, the core-shell composite particles can include one or more agricultural treatment materials coated with one or more layers for delayed and/or controlled release of the agricultural treatment materials into the surrounding environment. The layers can be or include one or more polymeric materials and/or one or more clays. In other embodiments, the core-shell composite particles can include a substrate or carrier particle that is treated with one or more agricultural treatment materials.

Also disclosed herein is a method of making the composite particle having the core-shell structure. The method can include providing seed particles containing an agricultural treatment material and providing a slurry containing a clay. The method can also include atomizing the slurry into droplets and coating the seed particles with the droplets to form green pellets, which can be dried to provide the composite particles. The method can be performed using the system depicted in FIG. 1.

Referring now to FIG. 1, a schematic of a system for preparing composite particles is illustrated. The system illustrated in FIG. 1 is similar in configuration and operation to that described in U.S. Pat. No. 4,440,866, the entire disclosure of which is incorporated herein by reference.

In the system illustrated in FIG. 1, a clay-containing raw material is passed through a shredder 105 which slices and breaks apart the raw material into small chunks. In some embodiments, when the raw material as mined, or as received, (referred to herein as "untreated" raw material) is of such consistency that it can be processed as described herein without shredding, the shredder may be bypassed.

Raw material fed through a shredder such as is illustrated in FIG. 1, is referred to as "treated" raw material.

The clay-containing raw material can be or include any suitable clay or inorganic oxide. In one or more embodiments, the clay can be a naturally-occurring clay or a synthetic clay. In one or more embodiments, the clay can include kaolin, bauxite, dikite, ball clay, halloysite, montmorillonite, calcium carbonate, potash, pyrophyllite, polysulphate, kieselguhr, endellite, saponite, rectorite, sepiolite, attapulgite, hydrotalcite, and bentonite and any combination thereof.

In certain embodiments, the shredder breaks apart and slices the clay-containing raw material so as to yield pieces having a diameter of less than about five inches, although pieces having smaller and larger diameters can be further processed into a slurry as described herein. Shredders and numerous other devices for slicing, chopping or comminuting the clay-containing raw material, as well as commercial sources for same, such as the Gleason Foundry Company, are well-known to those of ordinary skill in the art.

The treated or untreated clay-containing raw material and water are fed to a blunger 110, which has a rotating blade that imparts a shear force to and further reduces the particle size of the raw material to form a slurry. In a continuous process, the raw material and water are continuously fed to the blunger. Blungers and similar devices for making slurries of such materials, as well as commercial sources for same are well-known to those of ordinary skill in the art.

A sufficient amount of water is added to the blunger 110 to result in a slurry having a solids content in the range of from about 20% to about 70% by weight. In certain embodiments, a sufficient amount of water is added to the slurry such that the solids content of the slurry is from about 45% to about 55% by weight. In still other embodiments, a sufficient amount of water is added to the slurry such that the solids content of the slurry is about 20% by weight. The water added to the blunger 110 can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well-known and understood by those of ordinary skill in the art.

In certain embodiments, a dispersant is added to the slurry in the blunger 110 to adjust the viscosity of the slurry to a target range as discussed further below. In other embodiments, the viscosity of the slurry in the blunger 110 is adjusted to the target range by the addition of a dispersant and a pH-adjusting reagent.

A dispersant may be added to the slurry prior to the addition of other additives. In certain embodiments, the composition includes a dispersant in an amount of from about 0.15% to about 1.0% by weight based on the dry weight of the clay-containing raw material.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R. T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In certain embodiments, the target viscosity is less than 500 centipoises (cps) (as determined on a Brookfield Viscometer with a #61 spindle). In other embodiments, the target viscosity is less than 100 cps.

According to embodiments in which a pH-adjusting reagent is used, a sufficient amount of a pH-adjusting reagent is added to the slurry to adjust the pH of the slurry to a range of from about 8 to about 11. In certain embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 110 mixes the clay-containing raw material, water, dispersant and pH-adjusting reagent until a slurry is formed. The length of time required to form a slurry is dependent on factors such as the type and/or content of the clay-containing raw material, the size of the blunger, the speed at which the blunger is operating, and the amount of material in the blunger.

From the blunger 110, the slurry is fed to a tank 115, where the slurry is continuously stirred, and a binder can be added in an amount of from about 0.02% to about 5.0% by weight, based on the total dry weight of the clay-containing raw material. In certain embodiments, the binder can be added in an amount of from about 0.02% to about 3.0%, from about 0.5% to about 2.5%, from about 0.02% to about 0.5%, or from about 1% to about 2% by weight based on the total dry weight of the clay-containing raw material.

The tank 115 maintains the slurry created by the blunger 110. However, the tank 115 stirs the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

In another embodiment, the binder can be added to the slurry while in the blunger. In this embodiment, the blunger optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 115 illustrated in FIG. 1, the slurry is stirred in the tank, after addition of the binder, for a time sufficient to thoroughly mix the binder with the slurry. In certain embodiments, the slurry is stirred in the tank for up to about 30 minutes following the addition of binder. In other embodiments, the slurry is stirred in the tank 115 for at least about 30 minutes. In still other embodiments, the slurry is stirred in the tank for more than about 30 minutes after addition of the binder.

Tank 115 can also be a tank system comprised of one, two, three or more tanks. Any configuration or number of tanks that enables the thorough mixing of the binder with the slurry is sufficient. In a continuous process, water, and one or more of dust, oversize particles, or undersize particles from a subsequent fluidizer or other apparatus can be added to the slurry in the tank 115.

From the tank 115, the slurry can be fed to a heat exchanger 120, which heats the slurry to a temperature of about 25° C. to about 90° C. From the heat exchanger 120, the slurry is fed to a pump system 125, which feeds the slurry, under pressure, to a fluidizer 130.

A grinding mill(s) and/or a screening system(s) (not illustrated) can be inserted at one or more places in the system illustrated in FIG. 1 prior to feeding the slurry to the fluidizer to assist in breaking any larger-sized clay-containing raw material down to a target size suitable for feeding to the fluidizer. In certain embodiments, the target size is less than 230 mesh. In other embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

In one or more exemplary embodiments, the binder can be introduced at any location prior to any pelletizing process. In one or more exemplary embodiments, the binder material can be introduced to the grinder in dry form and subjected to grinding along with the raw material. In one or more exemplary embodiments, the binder material can be mixed or blended with the raw material before entering the grinder. In one or more exemplary embodiments, the binder material can be supplied directly to the grinder.

The mixture provided by the grinder can be introduced to the screening system that can screen out or remove binder particles having a size of about 50 microns or greater. These large separated binder particles can be recycled to the grinder for regrinding into smaller particles.

Referring again to FIG. 1, fluidizer 130 is of conventional design, such as described in, for example, U.S. Pat. No. 3,533,829 and U.K. Patent No. 1,401,303. Fluidizer 130 includes at least one atomizing nozzle 132 (three atomizing nozzles 132 being shown in FIG. 1), which is a pressure nozzle of conventional design. In other embodiments, one or more two-fluid nozzles are suitable. The design of such nozzles is well-known, for example from K. Masters: "Spray Drying Handbook", John Wiley and Sons, New York (1979).

Fluidizer 130 further includes a particle bed 134, which is supported by a plate 136, such as a perforated, straight or directional plate. Hot air flows through the plate 136. The particle bed 134 comprises seeds from which the composite particles of a target size can be obtained. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for composite particles made according to the present methods. In certain embodiments, the seed comprises from about 5% to about 90% of the total volume of a composite particle formed therefrom. Slurry is sprayed, under pressure, through the atomizing nozzles 132, and the slurry spray coats the seeds to form composite particles that can be substantially round and spherical.

The seeds can be placed on the perforated plate 136 before atomization of the slurry by the fluidizer begins. For example, the seeds can be delivered to the perforation plate 136 in the fluidizer 130 via line 145 through inlet port 162. The seeds can be prepared in a slurry process similar to that illustrated in FIG. 1, where the seeds are simply taken from the fluidizer at a target seed size. In other embodiments, the seeds can be prepared in a high intensity mixing process such as that described in U.S. Pat. No. 4,879,181, the entire disclosure of which is hereby incorporated by reference.

The seeds can be or include any suitable agricultural treatment material. Suitable agricultural treatment materials include, but are not limited to, fertilizers, soil conditioners, absorbent polymers (including superabsorbent polymers), nutrients, micronutrients or micronutrient fertilizers, pesticides, and the like. In one or more embodiments, the fertilizers can be or include urea, ammonium nitrate, sodium nitrate, phosphate rock, fluorapatite, hydroxyapatite, potash, potassium carbonate, potassium hydroxide, potassium chlorate, potassium chloride, potassium sulfate, potassium permanganate, potassium nitrate, or ammonium phosphate or any mixture or combination thereof. In one or more embodiments, the fertilizers can also be or include one or more organic fertilizers, such as animal wastes, manure, blood-meal, bone meal, feather meal, hides, hoofs, horns, plant wastes, compost, treated sewage sludge (biosolids), peat, and the like. For example, the seeds can be pelletized urea, ground or pulverized phosphate rock, pelletized potash, or pelletized organic fertilizers. In one or more embodiments, the micronutrient fertilizers can be or include one or more of zinc, boron, manganese, iron, copper, molybdenum, and oxides, sulfates, phosphates, polyphosphates, chlorides, carbonates, and nitrates of same. In one or more embodiments, the soil conditioners can be or include one or more of biochar, sulfur, lime, superabsorbent polymers, and the like.

In one or more embodiments, the pesticides can include one or more of herbicides, insecticides, nematicides, molluscicides, piscicides, avicides, rodenticides, bactericides, insect repellents, antimicrobial compositions, and fungicides. In one or more embodiments, the pesticides can be selected from carbamates, organophosphates, pyrethroids, neonicotinoids, strobilurin, fluvalinate, amitraz, coumaphos, chlorothalanil, chlorpyriphos, endosulfan, pendimethalin, fenpropathrin, esfenvalerate, azoxystrobin, methoxyfenozide, atrazine, bifenthrin, dicofol, aldicarb sulfoxide, trifluralin, boscalid, carbendazim, and combinations thereof.

The agricultural treatment material disclosed herein can also include any suitable mineral. In one or more embodiments, the agricultural treatment material can be or include cristobalite, mullite, alumina, silica-alumina, silica gel, mica, calcium silicate, bauxite, kaolin, talc, zirconia, fly ash, zeolites (including natural and synthetic zeolites), diatomaceous earth, fuller's earth, and organic synthetic high molecular weight water-insoluble adsorbents and combinations thereof. In one or more embodiments, the agricultural treatment material includes a ceramic material. For example, the agricultural material can be or include calcined or sintered clay, such as sintered kaolin, sintered bauxite, calcined kaolin, and calcined bauxite. In one or more embodiments, the agricultural treatment material can be or include ceramic proppant, such as the ceramic proppant described in U.S. Pat. Nos. 4,068,718, 4,427,068, 4,440,866, 5,188,175, 7,036,591, 8,865,631, 8,883,693, 9,175,210, 9,670,400, 10,077,395, 10,077,398, and 10,118,863, the entire disclosures of which are incorporated herein by reference.

In one or more embodiments, the seed can include an agricultural treatment material disclosed herein that is coated with one or more polymeric materials. The polymeric materials can be or include polyurea, polyurethane, polylactic acid, polyvinyl alcohol, chitosan, chitin, and resins, such as phenolic resins and epoxy resins. The polymeric materials can form a coating surrounding the agricultural treatment material that is biodegradable or semi-permeable and substantially non-biodegradable, thereby controlling, delaying, or otherwise limiting the release of the agricultural treatment material to the outside environment.

In one or more embodiments, the coating can be a semi-permeable, substantially non-biodegradable coating. The semi-permeable, substantially non-biodegradable coating can be or include polyurea, polyurethane, phenolic resins and/or epoxy resins. For example, the resin material can include a phenolic resin, such as a phenol-formaldehyde resin. In one or more embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

In one or more embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S. I. Group.

In one or more embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

In one or more embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

In one or more embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

In one or more embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

In one or more embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or 12.5 to about 13.

In one or more embodiments, the coating is an epoxy resin. The epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

In one or more embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

In one or more embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating particulates with resins and/or epoxy resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

In one or more embodiments, the coating can be a biodegradable coating. The biodegradable coating can include polyurethane-containing compounds, polyurea-containing compounds, polyolefins, aliphatic polyesters, polyethylene terephthalate (PET), polycarprolactone (PCL), polyesteramide (PEA), polybutylene succinate (PBS), polybutylene succinate adipate (PBSA), poly(vinyl alcohol) (PVOH), poly (vinyl acetate) (PVA), their copolymer and combination thereof.

In one or more embodiments, the biodegradable coating can include any suitable biopolymers, such as polysaccharides, poly-petides (protein), and lipids. Suitable polysaccharides can include, but not limited to, cellulose (e.g. methylcellulose, hydroxypropyl methyl cellulose, hydroxyethyl cellulose and etc.) starch derivatives from cotton, wood, starch from potatoes, corn, wheat, rice, chitosan, gums, fibers (e.g., bast (or stem or soft sclerenchyma) fibers, leaf or hard fibers, seed, fruit, wood, cereal straw, and other grass fibers). Suitable proteins can include, but are not limited to casein, collagen, gelatin from animal and zeine, soya, gluten from plants.

In one more embodiments, biopolymers suitable for use in or as the coating include, but are not limited to, poly (hydroxyalkanoate) (PHA), poly (caprolactone) (PCL),poly-3-hydroxybutyrate (PHB), poly (hydroxybutyrate-hydroxyvalerate) (PHB/HV), xanthan, curdian, pulluian and the combination thereof. In one more embodiments, the biopolymers can include, but not limited to polylactic acid or polylactide (PLA), polyglycolic acid (PGA), their copolymer, or combination thereof. The biopolymers can also include aliphatic polyesters polyethylene terephthalate (PET), polycarprolactone (PCL), polyesteramide (PEA), polybutylene succinate (PBS), polybutylene succinate adipate (PBSA), poly(vinyl alcohol) (PVOH), poly (vinyl acetate) (PVA), their copolymer and combination thereof.

In one or more embodiments, the seed is a pelletized absorbent polymer, as referred to as a superabsorbent polymer (SAP). As used herein, the term "absorbent polymer" or "superabsorbent polymer" refers to a cross-linked polymer network constituted by water-soluble building blocks. Superabsorbent polymers can be used as soil conditioners, nutrient carriers, and water reservoirs. SAPs can function by absorb/holding water resulting in a gel-like material. SAPs are generally composed of ionic monomers and are characterized by a low-crosslinking density, which can result in a large fluid uptake capacity (up to 1000 times their own weight). The total absorbency and swelling capacity can be controlled by the type and degree of cross-linkers used to make the gel.

SAPs can be classified according to their building blocks (synthetic, natural and semi-synthetic), morphology (fibers, powders, granules and sheets), crosslinking type (physical and chemical) and charge (non-ionic, ionic, ampholytic and zwitter-ionic).

The building blocks of a SAP can either be synthetic (e.g. acrylates, acrylamide), natural or a combination thereof (semi-synthetic). Synthetic SAPs can be synthesized from petrochemically-based monomers such as acrylates or acrylamide while natural SAPs can include polypeptides and polysaccharides.

Synthetic SAPs include but are not limited to poly(acrylic acid) alkali metal salts such as sodium polyacrylate and potassium polyacrylate, poly(alkoxy hydroxyl propyl)acrylates, poly(acrylic acid copolymer), poly(acrylic acid) grafted polyamide fibers, hydrolyzed poly(acrylonitrile), poly(maleic-anhydride)vinyl-polymers, polyacrylamide polymer, silicone, poly(2-hydroxyethyl methacrylate), poly (ethylene glycol), poly(acrylic acid co-acrylamide) and combinations thereof.

Natural SAPs can include polysaccharides and proteins. Polysaccharides can be harvested from biosynthesis occurring in plants and animals. Proteins used for SAP applications can be acrylated and, for example, in biomedical applications are often grafted onto other polymers such as poly(acrylic acid) to induce cell-interactive properties. Natural SAP polymers include but are not limited to polysaccharides such as alginate, chitosan, agar, carrageenan, dextrin, cellulose, starch, gellan gum, proteins such as soybean, fish, and collagen and combinations thereof.

Semi-synthetic or semi-natural SAPs can be synthesized by the addition of a synthetic constituent to a natural, polymeric backbone through graft polymerization. Semi-synthetic SAP can include but not limited to starch-poly(acrylamide), acrylic acid/gelatin, carboxymethyl cellulose/acrylic acid, chitin-acrylate, chitosan-poly(acrylic acid), methacrylated alginate-acrylate, methacrylated agarose/chitosan-DMAEMA, hydroxyethylacryl chitosan/sodium alginate, alginate-poly(acrylic acid-co-acrylamide), carboxymethyl starch-g-polyacrylamide, poly(acrylic acid)/nanofibirllated cellulose, cellulose/polyethyleneimine and their combination thereof.

SAPs particularly useful in agriculture applications can include but are not limited to polyacrylates (sodium or potassium polyacrylates), polyacrylamide, poly(vinyl alcohol), poly(ethylene glycol), poly(vinyl acetate-alt-maleic anhydride), chitosan-polyacrylic acid, starch-poly acrylamide/poly acrylic acid, cellulose-polyacrylamide, starch-polyacrylic acid and their combination thereof. The raw materials used to create such SAPs can include but are not limited to chitosan, alginate, starch, cellulose, carboxymethyl cellulose, acrylic acid, acrylamide, methacrylic acid, bentonite, or kaolin or combinations thereof.

Referring again to FIG. 1, hot air is introduced to the fluidizer 130 by means of a fan and an air heater, which are schematically represented at 138. The velocity of the hot air passing through the particle bed 134 is from about 0.9 meters/second to about 1.5 meters/second, and the depth of the particle bed 134 is from about 2 centimeters to about 60 centimeters. The temperature of the hot air when introduced to the fluidizer 130 is from about 250° C. to about 650° C. The temperature of the hot air as it exits from the fluidizer 130 is less than about 250° C., and in some embodiments is less than about 100° C.

The distance between the atomizing nozzles 132 and the plate 136 is optimized to avoid the formation of dust which occurs when the nozzles 132 are too far away from the plate 126 and the formation of irregular, coarse particles which occurs when the nozzles 132 are too close to the plate 136. The position of the nozzles 132 with respect to the plate 136 is adjusted on the basis of an analysis of powder sampled from the fluidizer 130.

The composite particles formed by the fluidizer accumulate in the particle bed 134. In a continuous process, the composite particles formed by the fluidizer 130 are withdrawn through an outlet 140 in response to the level of product in the particle bed 134 in the fluidizer 130, so as to maintain a given depth in the particle bed. A rotary valve 150 conducts composite particles withdrawn from the fluidizer 130 to an elevator 155, which feeds the composite particles to a screening system 160, where the composite particles are separated into one or more fractions, for example, an oversize fraction, a product fraction, and an undersize fraction.

The product fraction exiting the screening system 160 includes those composite particles having the desired product size. These composite particles can be dried or calcined. In certain embodiments, the composite particles are dried to a moisture content of less than about 18% by weight, or less than about 15% by weight, about 12% by weight, about 10% by weight, about 5% by weight, or about 1% by weight. After drying and/or calcining, the composite particles might not be fed to any sintering device or subjected to any sintering conditions.

The present disclosure is also directed to a pellet, or particle, and a method for making the particle. More particularly, the present disclosure is directed to a composite particle having a core-shell structure. The core can contain an agricultural treatment material and the shell can contain a clay-based material. In one or more embodiments, the composite particle is a substantially round and spherical. The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

FIG. 2 illustrates a schematic view of the shell slurry (e.g., droplets) 430 being sprayed onto the core material/seed 410, and FIG. 3 illustrates a schematic view of the shell slurry 430 wetting the outer surface of the core material/seed 410, according to an embodiment. The shell slurry 430 may then solidify on the outer surface of the core material/seed 410, producing a shell/layer 430 that at least partially surrounds the core material/seed 410. FIG. 4 illustrates a schematic view of the shell slurry 430 solidifying on the core material/seed 410, and FIG. 5 illustrates a schematic view of the solidified shell slurry (now referred to as a shell/layer) 430 on the core material/seed 410, thereby forming a composite particle 400, according to an embodiment.

FIG. 6 is a cross-sectional view of the composite particle 400, according to an embodiment. As shown, the composite particle 400 can include the core material/seed 410 and the shell/layer 430. The core material/pellet 410 may make up from about 30% to about 80% or about 40% to about 70% of the volume, mass, or average cross-sectional length (e.g., diameter) of the composite particle 400. The shell/layer 430 may make up from about 10% to about 40% or about 15% to about 30% of the volume, mass, or average cross-sectional length (e.g., diameter) of the composite particle 400.

The composite particle 400 can have any suitable size, such as for example, from about 2 mesh to about 400 mesh. For example, the composite particle 400 can have a size of about 10 mesh, 15 mesh, 20 mesh, 25 mesh, 30 mesh, or about 35 mesh to about 40 mesh, about 50 mesh, about 60 mesh, about 70 mesh, about 80 mesh, about 100 mesh, about 200 mesh, or about 300 mesh. In some embodiments, the composite particle 400 size can range from about 5 mesh to about 150 mesh, from about 10 mesh to about 80 mesh, from about 20 mesh to about 40 mesh, from about 30 mesh to about 70 mesh, or from about 8 mesh to about 14 mesh. The composite particle 400 can have any suitable shape. In one or more embodiments, the composite particle 400 can be spherical, oblong, oblate, prolate, egg-shaped, cylindrical, or unsymmetrical. In one or more embodiments, the composite particle 400 are substantially round and spherical.

In one or more embodiments, a porosity of the shell 430 can permit water to pass therethrough and contact the core material 410 and can permit portions of the core material to pass through the shell 430 and into a surrounding environment.

In one or more embodiments (not shown), an outer layer can be deposited onto the shell/layer 430. The outer layer can temporarily isolate the composite particle from a surrounding environment, such as a field of crops, to prevent premature release of the agricultural treatment material into the field of crops, for example. The outer layer can be or include any one or more of the shell coatings described herein.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A composite particle, comprising:
   a seed particle comprising an agricultural treatment material comprising urea; and
   a shell disposed on the seed particle, wherein the shell comprises a clay comprising kaolin, wherein the composite particle has an average cross-sectional length and the seed particle comprises about 30% to about 80% of the average cross-sectional length of the composite particle, and wherein the composite particle has a volume and the shell comprises about 10% to about 40% of the volume of the composite particle.

2. The composite particle of claim 1, wherein the seed particle further comprises a polymeric material coated onto the agricultural material.

3. The composite particle of claim 2, wherein the polymeric material is selected from the group consisting of polyurea, polyurethane, polylactic acid, polyvinyl alcohol, chitosan, chitin, phenolic resin, epoxy resin, and combination(s) thereof.

4. The composite particle of claim 3, wherein the polymeric material comprises polyurea.

5. The composite particle of claim 1, wherein the composite particle has a volume and the seed particle comprises about 30% to about 80% of the volume of the composite particle.

6. The composite particle of claim 1, wherein the composite particle has a mass and the seed particle comprises about 30% to about 80% of the mass of the composite particle.

7. The composite particle of claim 1, wherein the composite particle has a mass and the shell comprises about 10% to about 40% of the mass of the composite particle.

8. The composite particle of claim 1, wherein the composite particle has an average cross-sectional length and the shell comprises about 10% to about 40% of the average cross-sectional length of the composite particle.

9. The composite particle of claim 1, wherein the composite particle has a size of about 2 mesh to about 400 mesh.

10. The composite particle of claim 1, wherein the composite particle has a spherical, oblong, oblate, prolate, egg-shaped, cylindrical, or unsymmetrical shape.

11. A method of making a composite particle, comprising:
    atomizing a slurry comprising a clay comprising kaolin into droplets;
    coating a seed particle comprising an agricultural treatment material with the droplets to form a green pellet, the agricultural treatment material comprising urea; and
    drying a green pellet to form the composite particle, wherein the composite particle has an average cross-sectional length and the seed particle comprises about 30% to about 80% of the average cross-sectional length of the composite particle, and wherein the composite particle has a volume and the shell comprises about 10% to about 40% of the volume of the composite particle.

12. The method of claim 11, wherein the agricultural treatment material further comprises an absorbent polymer.

13. The method of claim 11, wherein the atomizing is performed at a temperature of about 25° C. to about 90° C.

14. A method of making a coated composite particle, comprising:
    atomizing a slurry comprising a clay comprising kaolin into droplets;
    coating a seed particle comprising an agricultural treatment material with the droplets to form a green pellet, the agricultural treatment material comprising urea;
    drying the green pellet to form a composite particle; and
    coating the composite particle with a biodegradable polymer to form the coated composite particle, wherein the composite particle has an average cross-sectional length and the seed particle comprises about 30% to about 80% of the average cross-sectional length of the composite particle, and wherein the composite particle has a volume and the shell comprises about 10% to about 40% of the volume of the composite particle.

15. The method of claim 14, wherein the agricultural treatment material further comprises an absorbent polymer.

16. The method of claim 14, wherein the biodegradable polymer comprises polyvinyl alcohol.

* * * * *